(12) United States Patent
Li

(10) Patent No.: US 7,607,680 B2
(45) Date of Patent: Oct. 27, 2009

(54) LUGGAGE TROLLEY

(76) Inventor: Kam Ming Li, Room 612 6/F, No. 125 Industrial Commercial Building, Renmin East Road, Zhuhai City, Guangdong Province (CN)

( * ) Notice: Subject to any disclaimer, the term of this patent is extended or adjusted under 35 U.S.C. 154(b) by 79 days.

(21) Appl. No.: 11/938,799

(22) Filed: Nov. 13, 2007

(65) Prior Publication Data

US 2009/0121456 A1 May 14, 2009

(51) Int. Cl.
*B62B 1/12* (2006.01)
(52) U.S. Cl. .................. 280/652; 280/47.27; 280/47.24
(58) Field of Classification Search ................. 280/651, 280/652, 47.27, 47.18, 47.29, 47.131, 43.14, 280/37, 47.24
See application file for complete search history.

(56) References Cited

U.S. PATENT DOCUMENTS

| | | | | |
|---|---|---|---|---|
| 3,892,429 A | * | 7/1975 | dit Dalmy | .................... 280/654 |
| 3,998,476 A | * | 12/1976 | Kazmark, Sr. | .............. 280/655 |
| 4,062,565 A | * | 12/1977 | Holtz | .......................... 280/655 |
| 4,248,453 A | * | 2/1981 | Stark | ........................... 280/655 |
| 4,522,425 A | * | 6/1985 | Cornwall et al. | ............ 280/656 |
| 4,865,346 A | * | 9/1989 | Carlile | ........................ 280/654 |
| 4,887,837 A | * | 12/1989 | Bonewicz et al. | ........... 280/654 |
| 5,306,027 A | * | 4/1994 | Cheng | .......................... 280/30 |
| 5,464,244 A | * | 11/1995 | Tsai | ............................ 280/655 |
| 5,673,928 A | * | 10/1997 | Jury | ............................ 280/645 |
| 5,695,246 A | * | 12/1997 | Tsai | ............................ 297/335 |
| 5,797,617 A | * | 8/1998 | Lin | ............................. 280/655 |
| 6,012,729 A | * | 1/2000 | Lin | ........................... 280/47.18 |
| 6,213,265 B1 | * | 4/2001 | Wang | ........................... 190/11 |
| 6,425,599 B1 | * | 7/2002 | Tsai | ............................ 280/652 |
| 6,447,002 B1 | * | 9/2002 | Fang | .......................... 280/646 |
| 6,789,809 B2 | * | 9/2004 | Lin | .......................... 280/47.25 |
| 7,040,635 B1 | * | 5/2006 | Remole | .................... 280/47.18 |
| 2002/0096862 A1 | * | 7/2002 | Fang | .......................... 280/652 |
| 2006/0261564 A1 | * | 11/2006 | Chuang | .................... 280/47.27 |

* cited by examiner

Primary Examiner—Jeffrey J Restifo

(57) ABSTRACT

A luggage trolley comprises a baseboard, a pull handle and running wheels. The running wheels are respectively rotatably fixed at two ends of an underside of the baseboard. The pull handle is fixed on the first baseboard periphery and its extending direction and a running direction of the running wheels are in a same plane surface. A foldable board is pivotably connected to a second baseboard periphery. A supporting axis which is parallel to the axle is disposed at an underside of the foldable board. A movable supporting stand is rotationally fixed on the supporting axis. One end of a spiral spring is fixed on the supporting axis and an opposite end thereof is fixed on a hook disposed on the movable supporting stand at a predetermined distance from the supporting axis. One end of the movable supporting stand near the supporting axis is disposed with a stopper which stops further rotation of the foldable board by pressing against the underside of the foldable board when the movable supporting stand rotates around the supporting axis to become perpendicular to a board surface of the foldable board. The present invention is simple to use and transports articles securely.

1 Claim, 4 Drawing Sheets

LUGGAGE TROLLEY

BACKGROUND OF THE INVENTION

The present invention relates to a transportation means used for transporting or carrying luggage and more particularly pertains to a luggage trolley people use in their daily life, work, business trips and travels.

Luggage trolleys are very common transportation means. As luggage trolleys are relatively large in size and occupy a larger space, they bring great inconvenience to people who are going on a trip. To reduce the space occupied during storage, luggage trolleys are usually collapsible and foldable. A conventional luggage trolley mainly comprises a baseboard used for receiving luggage articles and a pull handle used for pushing and pulling the trolley body. The baseboard of the luggage trolley is disposed with a wheel on each of the two sides thereof, and a supporting leg at the underside thereof. One of the peripheries of the baseboard is fixedly or removably connected to the pull handle. The supporting leg of this kind of luggage trolleys is usually engaged with a corresponding opening of the baseboard by insertion or fixation or fixed on the periphery of the baseboard by welding. The supporting leg and the wheels therefore constitute three supporting points of a luggage trolley. This increases the difficulty in reducing the size of the luggage trolley during storage. Moreover, during transportation of bulky articles, the transported articles have to lean against the pull handle to achieve a relatively secure support. If the road is rugged, the transported articles may easily slip off and get dirty and damaged.

BRIEF SUMMARY OF THE INVENTION

In view of the aforesaid disadvantages now present in the prior art, the object of the present invention is to provide a light luggage trolley which is simple to use, convenient to carry, occupies a small space during storage and transports articles securely.

To attain this, the present invention generally comprises a baseboard, a pull handle and running wheels. The running wheels are respectively rotatably fixed at two ends of an axle disposed at an underside of the baseboard near a first baseboard periphery thereof. The pull handle is fixed on the first baseboard periphery, and its extending direction and a running direction of the running wheels are in a same plane surface. A foldable board is pivotably connected to a second baseboard periphery opposite to the first baseboard periphery. A supporting axis which is parallel to the axle is disposed at an underside of the foldable board. A movable supporting stand is rotationally fixed on the supporting axis. One end of a spiral spring is fixed on the supporting axis, and an opposite end thereof is fixed on a hook disposed on the movable supporting stand at a predetermined distance from the supporting axis. One end of the movable supporting stand near the supporting axis is disposed with a stopper which stops further rotation of the foldable board by pressing against the underside of the foldable board when the movable supporting stand rotates around the supporting axis to become perpendicular to a board surface of the foldable board.

Preferably, the underside of the baseboard of the present invention is disposed with a plunger latch. A keyhole which allows insertion and/or withdrawal of the plunger latch is disposed at the underside of the foldable board at a position corresponding to the position of the plunger latch.

By disposing at the underside of the foldable board a movable supporting stand which can be perpendicular or parallel to the plane surface of the foldable board, the movable supporting stand can provide effective support to the foldable board during use. The movable supporting stand can also be folded to the plane surface of the foldable board during storage so as to effectively reduce the space the present invention occupies. Moreover, disposing a locking mechanism comprising a plunger latch and a keyhole between the baseboard and the foldable board of the present invention can help keep the baseboard and the foldable board in a same plane surface and thereby providing a secure supporting platform for the transported articles.

DETAILED DESCRIPTION OF THE INVENTION

Figure 1:
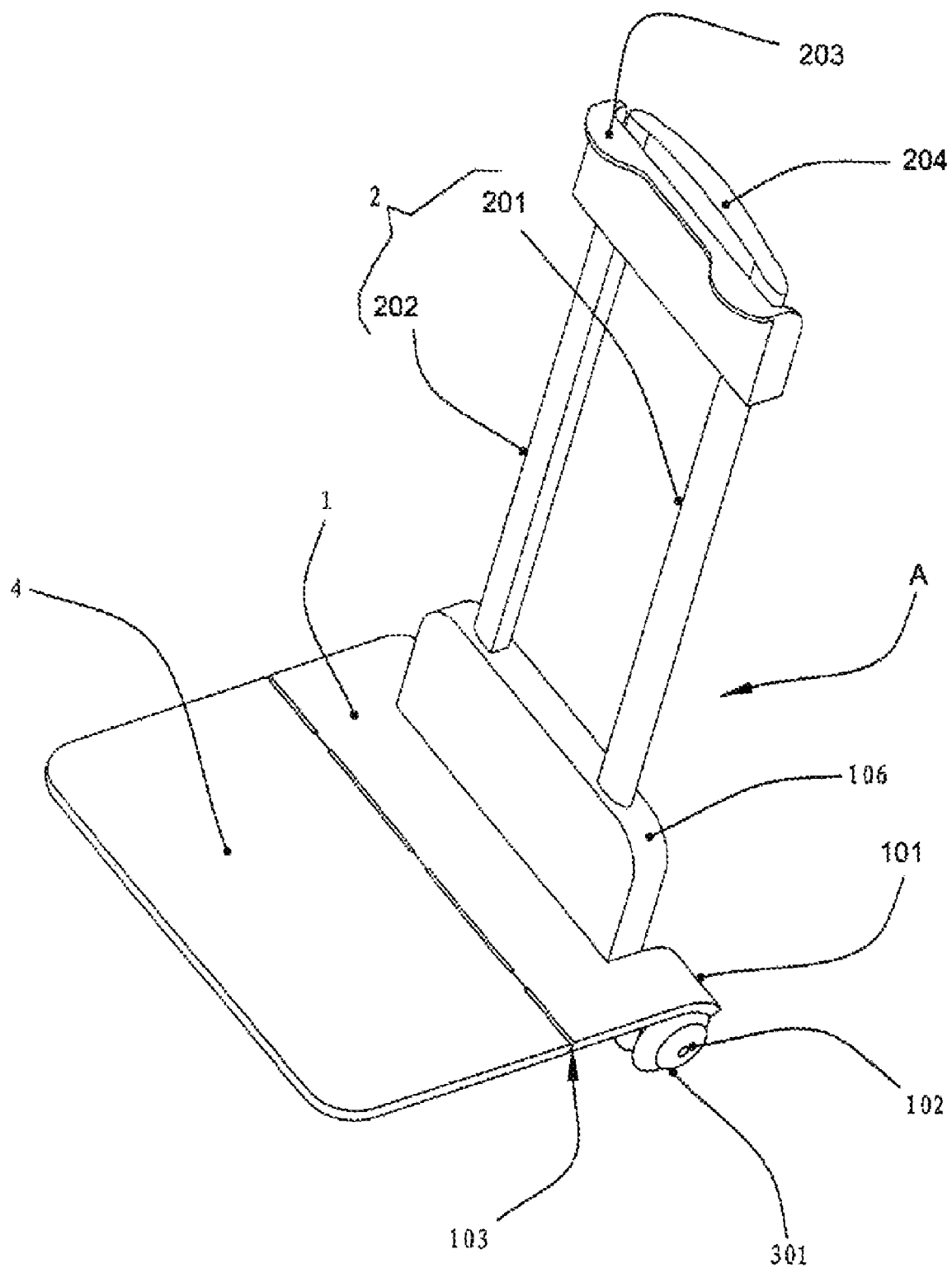
FIG. 1 shows a perspective view of the present invention.
Figure 2:
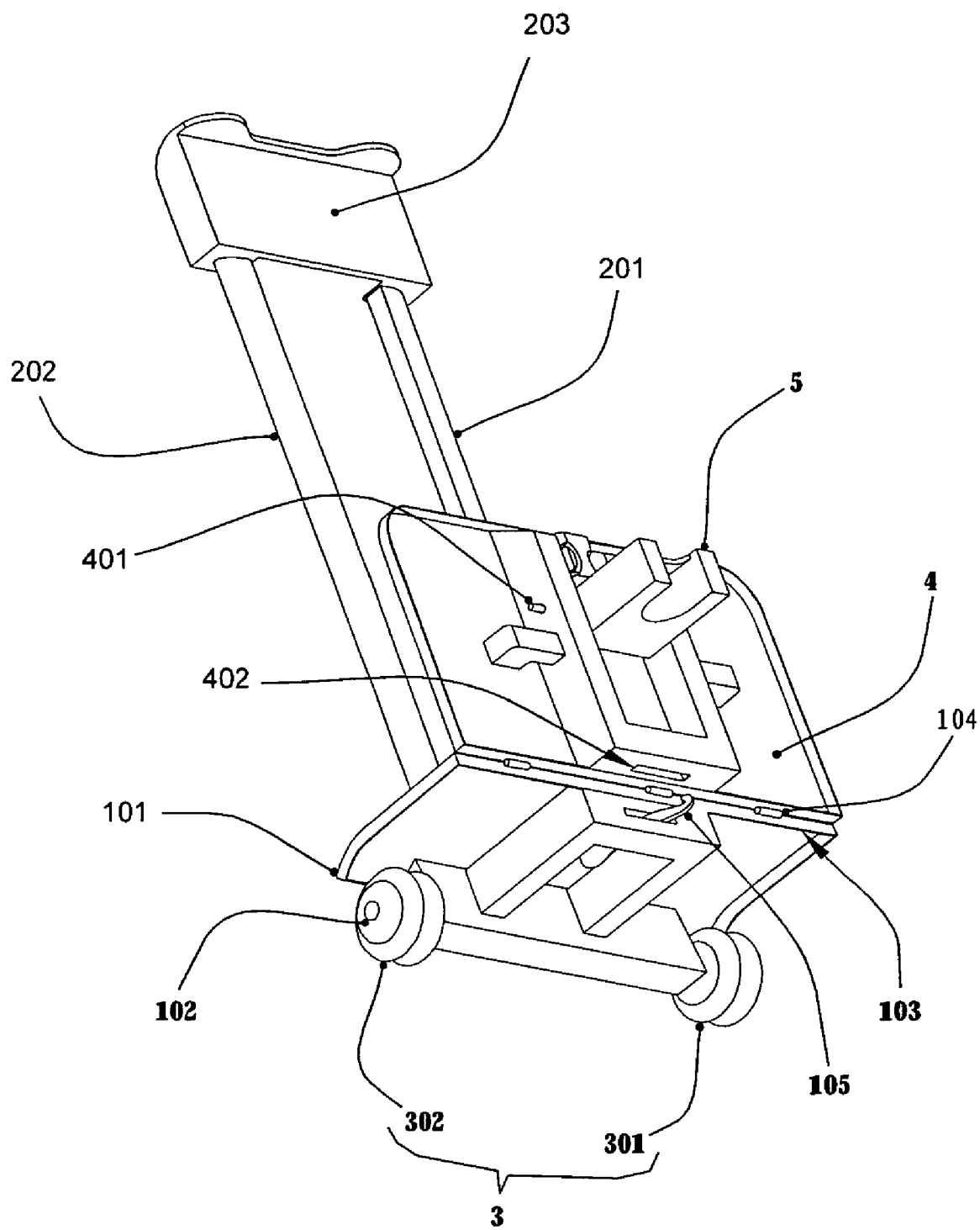
FIG. 2 shows another perspective view of the present invention.
Figure 3:
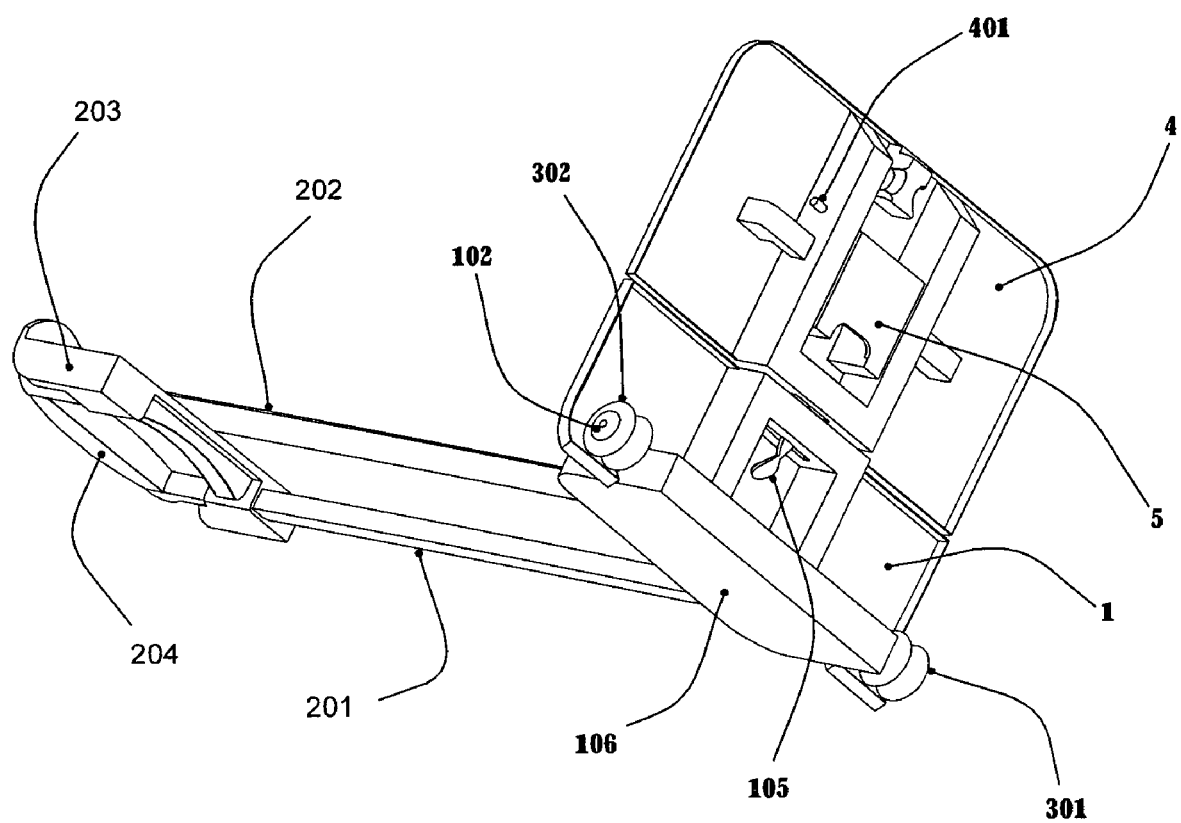
FIG. 3 shows the third perspective view of the present invention.
Figure 4A:
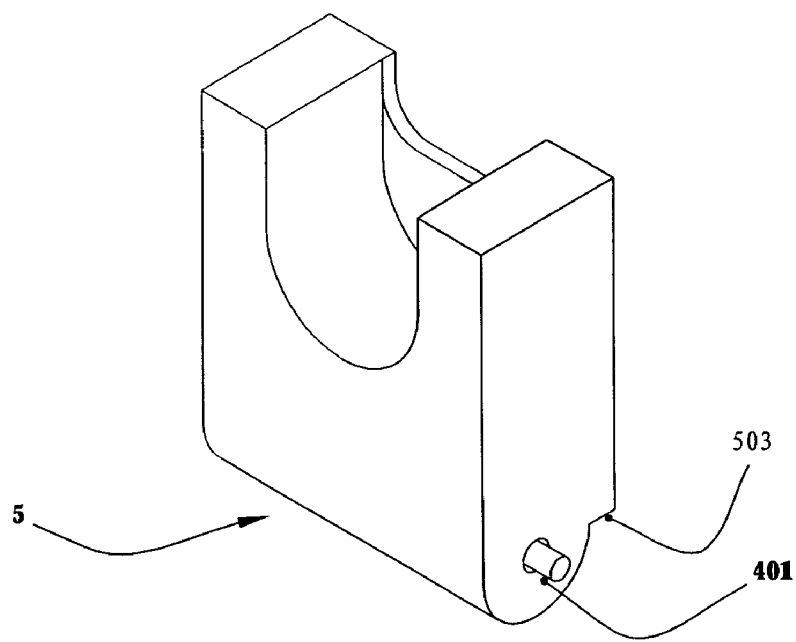
FIG. 4a is the perspective view of a member of the present invention.
Figure 4B:
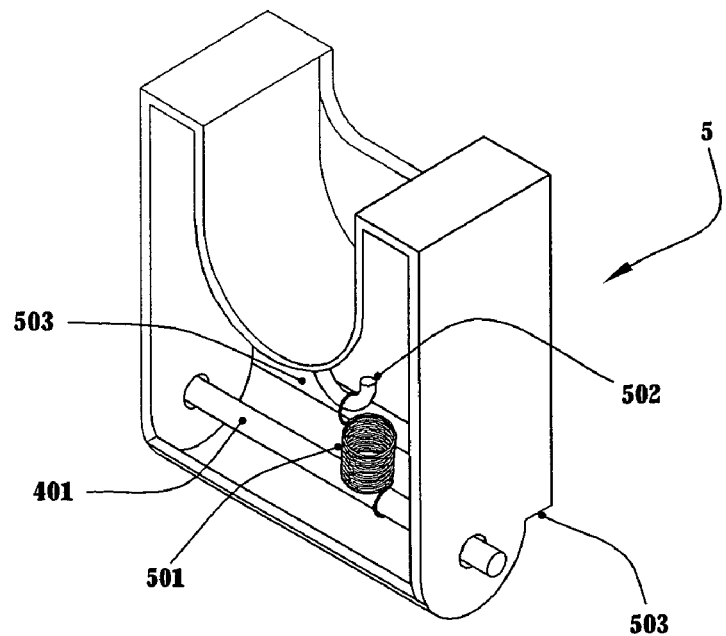
FIG. 4b is the cross-sectional view of the member of the present invention.

FIGS. 1 to 4 illustrate the construction of the present invention from different projection angles and its related member.

The luggage trolley A comprises a baseboard 1, a pull handle 2 and running wheels 3.

The baseboard 1 is a rectangular stiff board. The two wheels 301, 302 of the running wheels 3 are respectively fixed at two ends of an axle 102 disposed at an underside of the baseboard 1 near a first baseboard periphery 101 thereof. Each of the two wheels 301, 302 can independently rotate around the axle 102.

The pull handle 2 comprises two parallel long rods 201, 202, each of which has one end fixedly connected to an extension member 106 extended from the first baseboard periphery 101 of the baseboard, and the other end disposed with a handle 203 which connects the two long rods 201, 202. The extension member 106 extends towards the same direction as the two long rods 201, 202, that is, perpendicular to the board surface of the baseboard 1. The longitudinal direction or the extending direction of the two long rods 201, 202 and the running direction of the two wheels 301, 302 are in a same plane surface. Usually, between the longitudinal direction of the two long rods 201, 202 and the running direction of the two wheels 301, 302, an acute angle is formed when the luggage trolley A is being pulled through the handle 203 while an obtuse angle is formed when the luggage trolley A is being pushed through the handle 203. In order to reduce the size of the luggage trolley A, each of the two long rods 201, 202 is usually disposed with an extension rod which can extend or retract in their inner tubes, and the extending ends of the extension rods are disposed with a handle 204.

A foldable board 4 is connected pivotably to a second baseboard periphery 103 opposite to the first baseboard periphery 101. The second baseboard periphery 103 is parallel to the axle 102. In this way, the foldable board 4 can rotate around the pivots 104 disposed on the second baseboard periphery 103 so that the foldable board 4 can be folded to lie on the baseboard 1 or become perpendicular to the baseboard 1. The underside of the foldable board 4 is disposed with a supporting axis 401 which is parallel to the axle 102. A movable supporting stand 5 is fixed on the supporting axis 401 and can rotate around the supporting axis 401. One end of a spiral spring 501 is fixed on the supporting axis 401, and an opposite end thereof is fixed on a hook 502. The hook 502 is fixedly disposed on the inner frame of the movable supporting stand 5 (refer to FIGS. 4*a* and 4*b*) at a predetermined distance from the supporting axis 401. The spiral spring 501 hanging between the supporting axis 401 and the hook 502 is usually tensed so that the movable supporting stand 5 is maintained at a relatively fixed angular phase position relative to the supporting axis 401. One end of the movable supporting stand 5 near the supporting axis 401 is disposed with a stopper 503. The stopper 503 can be part of the movable supporting stand 5. When the movable supporting stand 5 rotates around the supporting axis 401 to become perpendicular to the board surface of the foldable board 4, the stopper 503 presses against the underside of the foldable board 4 to stop further rotation of the movable supporting stand 5 (refer to FIG. 2). Therefore, the pulling force exerted on the movable supporting stand 5 by the spiral spring 501 through the hook 502 which makes the movable supporting stand 5 deviate from the direction perpendicular to the board surface of the foldable board 4 is neutralized by the pressure between the stopper 503 and the underside of the foldable board 4, thereby securing the movable supporting stand 5 on a direction perpendicular to the board surface of the foldable board 4. At the same time, the pressure between the stopper 503 and the underside of the foldable board 4 can further provide support to the foldable board 4 for receiving luggage.

The underside of the baseboard 1 near the second baseboard periphery 103 is disposed with a plunger latch 105. The plunger latch 105 is a curved hook which can rotate or turn around a direction perpendicular to the baseboard 1. A keyhole 402 which allows insertion or withdrawal of the plunger latch 105 is disposed at the underside of the foldable board 4 near the second baseboard periphery 103 at a position corresponding to the position of the plunger latch 105. When the luggage trolley A is in use, the plunger latch 105 of the baseboard is inserted into the keyhole 402 of the foldable board so as to fix the baseboard 1 and the foldable board 4 in the same plane surface so that luggage can be disposed on the upper surfaces of the baseboard 1 and the foldable board 4.

To use the luggage trolley A, first lower the foldable board 4 until it is in the same plane surface as the baseboard 1. Then, insert the plunger latch 105 of the baseboard into the keyhole 402 of the foldable board to fix the foldable board 4. The luggage trolley A is then ready for use (refer to FIGS. 1 and 3). To store the luggage trolley A disposed with transported articles, pull out the movable supporting stand 5 around the supporting axis 401 so that it becomes perpendicular to the board surface of the foldable board 4. In this way, the movable supporting stand 5 remains upright as the stopper 503 presses against the underside of the foldable board 4 (FIG. 2 only shows that the movable supporting stand 5 is perpendicular to the board surface of the foldable board 4; refer to status shown in FIGS. 1 and 3 for the position relation of the foldable board 4 and the baseboard 1), and the luggage trolley A is securely supported by three supporting points, namely the two wheels 301, 302 and the movable supporting stand 5.

What is claimed is:

1. A luggage trolley comprising a baseboard, a pull handle and running wheels, the running wheels are respectively rotatably fixed at two ends of an axle disposed at an underside of the baseboard near a first baseboard periphery thereof, the pull handle is fixed on the first baseboard periphery and its extending direction and a running direction of the running wheels are in a same plane surface, and a foldable board is pivotably connected to a second baseboard periphery opposite to the first baseboard periphery, wherein a supporting axis which is parallel to the axle is disposed at an underside of the foldable board;

a movable supporting stand is rotationally fixed on the supporting axis; one end of a spiral spring is fixed on the supporting axis and an opposite end thereof is fixed on a hook disposed on the movable supporting stand at a predetermined distance from the supporting axis; one end of the movable supporting stand near the supporting axis is disposed with a stopper which stops further rotation of the foldable board by pressing against the underside of the foldable board when the movable supporting stand rotates around the supporting axis to become perpendicular to a board surface of the foldable board; the underside of the baseboard is disposed with a plunger latch, and a keyhole which allows insertion and/or withdrawal of the plunger latch is disposed at the underside of the foldable board at a position corresponding to the position of the plunger latch.

* * * * *